United States Patent
Pesyna et al.

(10) Patent No.: US 10,677,166 B2
(45) Date of Patent: Jun. 9, 2020

(54) HEAT EXCHANGER FOR A GAS TURBINE ENGINE PROPULSION SYSTEM

(71) Applicant: Rolls-Royce North American Technologies, Inc., Indianapolis, IN (US)

(72) Inventors: Kenneth M. Pesyna, Carmel, IN (US); Douglas J. Snyder, Carmel, IN (US)

(73) Assignee: Rolls-Royce North American Technologies Inc., Indianapolis, IN (US)

(*) Notice: Subject to any disclaimer, the term of this patent is extended or adjusted under 35 U.S.C. 154(b) by 611 days.

(21) Appl. No.: 15/227,543

(22) Filed: Aug. 3, 2016

(65) Prior Publication Data
US 2017/0044984 A1  Feb. 16, 2017

Related U.S. Application Data

(60) Provisional application No. 62/204,260, filed on Aug. 12, 2015.

(51) Int. Cl.
| F02C 7/18 | (2006.01) |
|---|---|
| F02C 7/14 | (2006.01) |
| F02C 6/08 | (2006.01) |
| F02C 9/18 | (2006.01) |
| F01D 25/12 | (2006.01) |
| F02K 3/115 | (2006.01) |
| B64D 33/10 | (2006.01) |
| F02K 3/06 | (2006.01) |

(52) U.S. Cl.
CPC .............. *F02C 7/185* (2013.01); *B64D 33/10* (2013.01); *F01D 25/12* (2013.01); *F02C 6/08* (2013.01); *F02C 7/14* (2013.01); *F02C 9/18* (2013.01); *F02K 3/06* (2013.01); *F02K 3/115* (2013.01); *Y02T 50/675* (2013.01)

(58) Field of Classification Search
CPC .. F02C 7/14; F02C 7/141; F02C 7/143; F02C 7/18; F02C 7/185; F02C 6/08; F02C 9/18; B64D 33/10; F01D 25/12; F02K 3/075; F02K 3/06; F02K 3/115; Y02T 50/675
USPC ......................................................... 60/728
See application file for complete search history.

(56) References Cited

U.S. PATENT DOCUMENTS

| 4,187,675 A | 2/1980 | Wakeman |
|---|---|---|
| 4,254,618 A | 3/1981 | Elovic et al. |

(Continued)

FOREIGN PATENT DOCUMENTS

| EP | 1876328 A2 | 1/2008 |
|---|---|---|
| EP | 2085599 A2 | 8/2009 |

(Continued)

OTHER PUBLICATIONS

Extended European Search Report, European Application No. 16180259.0-1607, dated Jan. 12, 2017, 11 pages.

(Continued)

*Primary Examiner* — Mark A Laurenzi
*Assistant Examiner* — Loren C Edwards
(74) *Attorney, Agent, or Firm* — Barnes & Thornburg LLP (57) ABSTRACT

A propulsion system including a gas turbine engine is disclosed herein. The propulsion system further includes a heat exchanger arranged outside the gas turbine engine and adapted to cool fluid from the gas turbine engine.

16 Claims, 4 Drawing Sheets

(56) References Cited

U.S. PATENT DOCUMENTS

| | | | |
|---|---|---|---|
| 5,123,242 A * | 6/1992 | Miller | F02C 7/14 |
| | | | 165/300 |
| 5,163,285 A | 11/1992 | Mazeaud et al. | |
| 5,269,135 A | 12/1993 | Vermejan et al. | |
| 6,106,229 A | 8/2000 | Nikkanen et al. | |
| 6,324,828 B1 | 12/2001 | Willis et al. | |
| 6,550,253 B2 | 4/2003 | Mortzheim et al. | |
| 6,672,072 B1 | 1/2004 | Giffin, III | |
| 7,823,389 B2 | 11/2010 | Seltzer et al. | |
| 7,997,061 B2 | 8/2011 | Marche | |
| 8,181,443 B2 | 5/2012 | Rago | |
| 8,266,889 B2 | 9/2012 | Coffinberry | |
| 8,307,662 B2 | 11/2012 | Turco | |
| 8,387,362 B2 | 3/2013 | Storage et al. | |
| 8,397,487 B2 | 3/2013 | Sennoun et al. | |
| 9,212,623 B2 | 12/2015 | Murphy et al. | |
| 9,303,526 B2 | 4/2016 | Chir et al. | |
| 2007/0245738 A1 | 10/2007 | Stretton et al. | |
| 2007/0277888 A1 | 12/2007 | Scanlon | |
| 2008/0006021 A1 * | 1/2008 | Schwarz | F02C 7/14 |
| | | | 60/204 |
| 2009/0188234 A1 * | 7/2009 | Suciu | F02C 7/14 |
| | | | 60/262 |
| 2012/0259483 A1 * | 10/2012 | Villano | B64C 13/505 |
| | | | 701/3 |
| 2013/0164115 A1 | 6/2013 | Sennoun | |
| 2013/0219920 A1 | 8/2013 | Suciu et al. | |
| 2014/0208769 A1 | 7/2014 | Bourassa et al. | |
| 2014/0250895 A1 | 9/2014 | McMahon et al. | |
| 2015/0300266 A1 | 10/2015 | Glahn et al. | |
| 2016/0369697 A1 | 12/2016 | Schwarz et al. | |
| 2017/0044984 A1 | 2/2017 | Pesyna et al. | |
| 2017/0074172 A1 | 3/2017 | Little | |
| 2018/0058473 A1 | 3/2018 | Kenworthy et al. | |

FOREIGN PATENT DOCUMENTS

| | | |
|---|---|---|
| EP | 2256294 A1 | 12/2010 |
| EP | 3106646 A1 | 12/2016 |
| GB | 2474567 A | 4/2011 |
| WO | 2014051678 A1 | 4/2014 |
| WO | 2014055152 A2 | 4/2014 |
| WO | 2014120125 A1 | 8/2014 |

OTHER PUBLICATIONS

European Official Action dated Jun. 15, 2018 issued in connection with European Patent Appln. No. 16180259.0; 7 pages.

* cited by examiner

HEAT EXCHANGER FOR A GAS TURBINE ENGINE PROPULSION SYSTEM

CROSS REFERENCE TO RELATED APPLICATIONS

This application claims priority to and the benefit of U.S. Provisional Patent Application No. 62/204,260, filed 12 Aug. 2015, the disclosure of which is now expressly incorporated herein by reference.

FIELD OF THE DISCLOSURE

The present disclosure relates generally to propulsion systems, and more specifically to propulsion systems including gas turbine engines.

BACKGROUND

Propulsion systems used in some aircraft include gas turbine engines that have an engine core operable to generate thrust for moving the aircraft. To reduce the operating temperatures of components of the engine core, pressurized air passed through the engine core may be cooled using a cooling unit. When confronted with the space constraints of some gas turbine engines, placement of a cooling unit in the engine core presents a number of drawbacks.

SUMMARY

The present disclosure may comprise one or more of the following features and combinations thereof.

According to one aspect of the present disclosure, a propulsion system for an aircraft may include a gas turbine engine and a nacelle. The gas turbine engine may include an engine core and a fan coupled to the engine core. The fan may be configured to discharge pressurized bypass air that is passed around the engine core. The nacelle may surround a portion of the gas turbine engine, and the nacelle may include a strut and a cooling unit housed in the strut. The strut may extend away from the gas turbine engine, and the cooling unit may be fluidly coupled to the gas turbine engine to cool fluid or gas from the gas turbine engine and return the cooled fluid or gas to the gas turbine engine. The cooling unit may include a duct, a heat exchanger positioned within the duct, and a diverter valve. The diverter valve may be movable within the duct from a first position arranged to direct pressurized bypass air moving through the duct into contact with the heat exchanger to a second position arranged to divert pressurized bypass air around the heat exchanger without contacting the heat exchanger.

In some embodiments, the cooling unit may be positioned radially-outward of the engine core and radially-inward of an outer shroud included in the nacelle. Additionally, in some embodiments, the duct may include a divider extending along the length of the duct to divide the duct into an outer flow portion and an inner flow portion positioned radially-inward of the outer flow portion. Additionally, in some embodiments still, the diverter valve may be movable between the first and second positions to control cooling of the fluid or gas from the gas turbine engine.

In some embodiments, the diverter valve may include a first actuator and a plate coupled to the first actuator, and the first actuator may be operable to pivot the plate relative to the duct between the first and second positions. The diverter valve may include a second actuator coupled to the plate, and the second actuator may be operable to move the plate relative to the duct between the first and second positions in the event of a failure of the first actuator.

In some embodiments, the heat exchanger may have a core having a face, and pressurized bypass air directed into contact with the heat exchanger by the diverter valve when the diverter valve is in the first position may be conducted by a header included in the duct to the core at an angle to the face that is different from 90 degrees. Pressurized bypass air directed into contact with the heat exchanger by the diverter valve when the diverter valve is in the first position may be conducted by the header from an inlet of the duct to the core of the heat exchanger along a forward flow path generally parallel to an aft flow path along which pressurized bypass air is conducted away from the heat exchanger to an outlet of the duct.

In some embodiments, the fan may be configured to discharge pressurized bypass air in a direction having a circumferential component and an axial component at an outlet thereof, and an inlet of the duct may be shaped to open axially and circumferentially to receive the pressurized bypass air discharged from the fan so that the total pressure of the pressurized bypass air is captured by the duct during operation of the propulsion system. An outlet of the duct may be shaped to discharge pressurized bypass air in a substantially axial direction only.

According to another aspect of the present disclosure, an aircraft may include an airframe, a gas turbine engine, and a nacelle. The gas turbine engine and the nacelle may be supported by the airframe. The gas turbine engine may include an engine core defining an engine axis and a fan coupled to the engine core. The fan may be configured to discharge pressurized bypass air that is passed around the engine core. The nacelle may surround a portion of the gas turbine engine, and the nacelle may include a pylon, a strut, and a cooling unit. The pylon may be coupled to the airframe, and the strut may be spaced from the pylon and extend outwardly from the gas turbine engine away from the engine axis. The cooling unit may be housed in the strut and fluidly coupled to the gas turbine engine to cool fluid or gas from the gas turbine engine. The cooling unit may be configured to receive pressurized bypass air from the fan and pass the pressurized bypass air through a heat exchanger included in the cooling unit during operation of the aircraft.

In some embodiments, the pylon may be spaced about 180 degrees from the strut and the cooling unit about the engine axis. Additionally, in some embodiments, the cooling unit may be positioned radially-outward of the engine core and radially-inward of an outer shroud included in the nacelle.

In some embodiments, the cooling unit may include a duct having walls housed in the strut and a diverter valve that is movable within the duct from a first position arranged to direct pressurized bypass air moving through the duct into contact with the heat exchanger to a second position arranged to divert pressurized bypass air around the heat exchanger without contacting the heat exchanger. The duct may include a divider extending along the length of the duct to divide the duct into an outer flow portion and an inner flow portion positioned radially-inward of the outer flow portion. Additionally, in some embodiments, the diverter valve may include a first actuator and a plate coupled to the first actuator, and the first actuator may be operable to pivot the plate relative to the duct between the first and the second positions. The diverter valve may include a second actuator coupled to the plate, and the second actuator may be operable to move the plate relative to the duct between the first and second positions in the event of a failure of the first actuator. Additionally, in some embodiments still, the heat exchanger may have a core having a face, and pressurized bypass air directed into contact with the heat exchanger by the diverter valve when the diverter valve is in the first position may be conducted by a header included in the duct to the core at an angle to the face that is different from 90 degrees. Pressurized bypass air directed into contact with the heat exchanger by the diverter valve when the diverter valve is in the first position may be conducted by the header from an inlet of the duct to the core of the heat exchanger along a forward flow path generally parallel to an aft flow path along which pressurized bypass air is conducted away from the heat exchanger to an outlet of the duct.

In some embodiments, the fan may be configured to discharge pressurized bypass air in a direction having a circumferential component and an axial component at an outlet thereof, and an inlet of the duct may be shaped to open axially and circumferentially to receive the pressurized bypass air discharged from the fan so that the total pressure of the pressurized bypass air is captured by the duct during operation of the aircraft. An outlet of the duct may be shaped to discharge pressurized bypass air in a substantially axial direction only These and other features of the present disclosure will become more apparent from the following description of the illustrative embodiments.

DETAILED DESCRIPTION OF THE DRAWINGS

Figure 1:
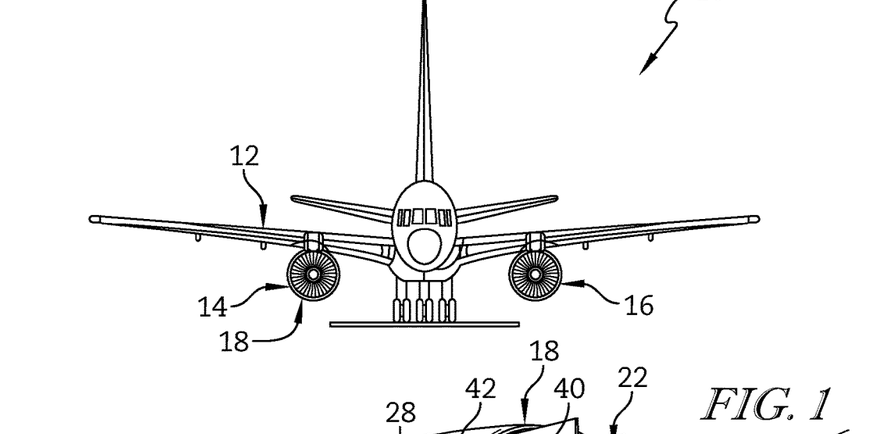
FIG. 1 is a front elevation view of an aircraft including an airframe and a pair of propulsion systems supported by the airframe that each have a gas turbine engine and a nacelle that surrounds a portion of the gas turbine engine and is coupled to the airframe.

Referring now to FIG. 1, an illustrative aircraft 10 includes an airframe 12 and a pair of propulsion systems 14, 16 that are coupled to the airframe 12 opposite one another. The propulsions systems 14, 16 are substantially identical to one another. In other embodiments, however, the aircraft 10 may include any suitable number of propulsion systems other than the two propulsions systems 14, 16.

Figure 2:
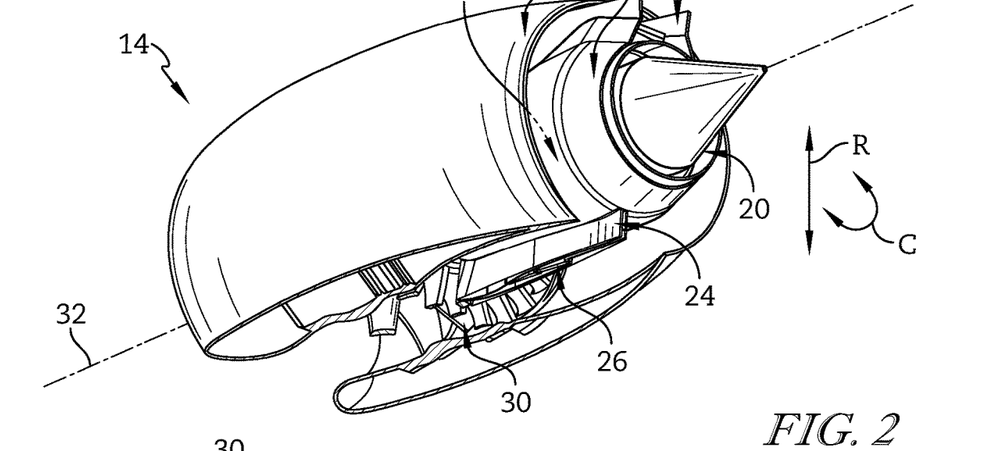
FIG. 2 is a cutaway perspective view of one of the propulsion systems of FIG. 1 detached from the airframe and showing that the nacelle includes a strut that extends downwardly away from the gas turbine engine toward an outer shroud and a pylon that extends upwardly from the gas turbine engine to couple the propulsion system to the airframe.

Referring now to FIG. 2, the propulsion system 14 illustratively includes a nacelle 18 and a gas turbine engine 20. The nacelle 18 is coupled to the airframe 12, as shown in FIG. 1, and surrounds at least a portion of the gas turbine engine 20, as best seen in FIG. 2. The gas turbine engine 20 is configured to generate thrust to move the aircraft 10 while being supported in the nacelle 18.

The nacelle 18 illustratively includes a pylon 22, a strut 24, and a cooling unit 26 as shown in FIG. 2. The pylon 22 is configured to couple to the airframe 12 and extends away from the gas turbine engine 20. The strut 24 also extends away from the gas turbine engine 20 and is spaced from the pylon 22 in a circumferential direction indicated by arrow C. The cooling unit 26 is housed in the strut 24 and fluidly coupled to the gas turbine engine 20 to cool fluid from the engine 20 and return the cooled fluid to the engine 20.

In the illustrative embodiment, the nacelle 18 includes only one strut 24 and one cooling unit 26 housed in the strut 24. In other embodiments, however, the nacelle 18 may include multiple struts 24 that each house one cooling unit 26.

The gas turbine engine 20 illustratively includes an engine core 28 and a fan 30 that is coupled to the engine core 28 to be driven by the engine core 28 as shown in FIG. 2. The engine core 28 is configured to pass pressurized air therethrough so that the pressurized air flows aftward along an engine axis 32 defined by the engine core 28. The fan 30 is configured to discharge pressurized bypass air that is passed around the engine core 28 aftward along the engine axis 32.

Figure 3:
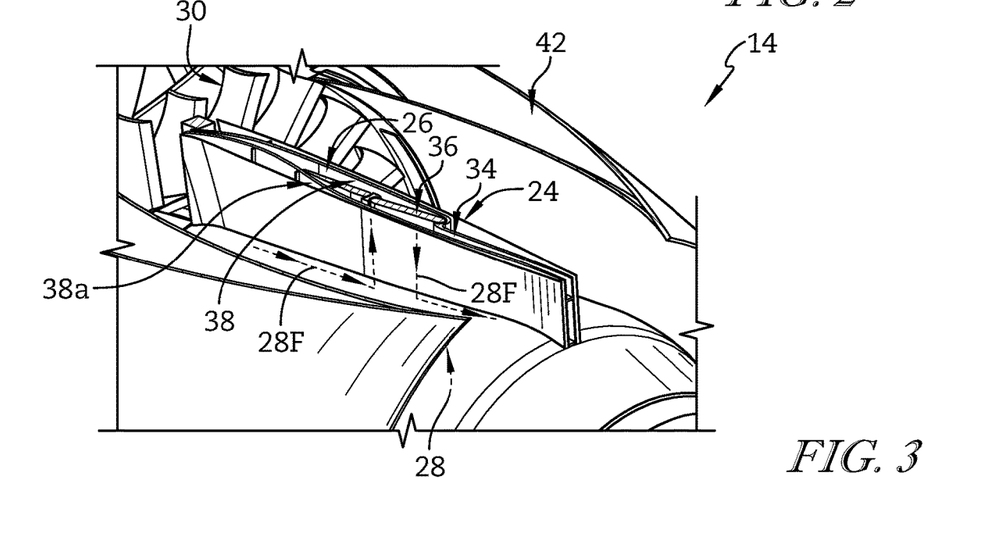
FIG. 3 is a detail view of a strut included in the propulsion system of FIG. 2 showing that the nacelle includes a cooling unit housed in the strut and configured to received pressurized bypass air discharged from a fan of the gas turbine engine.

As best seen in FIGS. 2-3, the cooling unit 26 illustratively includes a duct 34, a heat exchanger 36, and a diverter valve 38. The heat exchanger 36 and the diverter valve 38 are positioned within the duct 34, and the diverter valve 38 is movable therein from an open position 38a (see FIGS. 4-5) to a closed position 38b (see FIGS. 6-7). In the open position 38a, the diverter valve 38 directs the bypass air discharged by the fan 30 through the duct 34 and into contact with the heat exchanger 36. In the closed position 38b, the diverter valve 38 diverts the bypass air discharged by the fan 30 around the heat exchanger 36 without contacting the heat exchanger 36. The cooling unit 26 is therefore configured to selectively pass bypass air through the heat exchanger 36 during operation of the aircraft 10.

Referring now to FIG. 3, when the diverter valve 38 is in the open position 38a, fluid from the engine core 28 passes along a flow path 28F. Specifically, fluid from the engine core 28 passes along the flow path 28F from one component of the engine core 28 through the heat exchanger 36 and is returned to another component of the engine core 28 by the heat exchanger 36. Fluid is illustratively pressurized air provided to the heat exchanger 36 along the flow path 28F by a compressor of the engine core 28. The pressurized air provided to the heat exchanger 36 is illustratively returned to a turbine of the engine core 28 along the flow path 28F to cool the turbine.

In other embodiments, the heat exchanger 36 may be adapted to cool oil, fuel, or any other fluid that is provided thereto by the engine core 28 or by any other part of the aircraft 10. In those embodiments, fluid may be provided to the heat exchanger 36 by the engine core 28 or by any other part of the aircraft 10 along another suitable flow path. Additionally, in those embodiments, fluid provided to the heat exchanger 36 may be returned to the engine core 28 or any other part of the aircraft 10 along another suitable flow path.

Referring again to FIG. 2, the strut 24 is illustratively positioned between an engine case 40 of the gas turbine engine 20 that surrounds the engine core 28 and an outer shroud 42 of the nacelle 18. The strut 24 is coupled to the engine case 40 to extend outwardly therefrom and away from the engine axis 32 toward the outer shroud 42. As such, the cooling unit 26 is positioned outward of the engine core 28 and inward of the outer shroud 42 in a radial direction indicated by arrow R.

The strut 24 is illustratively spaced from the pylon 22 about the engine axis 32 in the circumferential direction indicated by arrow C as shown in FIG. 2. Specifically, the strut 24 is spaced about 180 degrees from the pylon 22 about the axis 32 in the circumferential direction indicated by arrow C. When the propulsion system 14 is coupled to the airframe 12 as shown in FIG. 1, the pylon 22 is positioned above the gas turbine engine 20, whereas the strut 24 is positioned below the engine 20. In other embodiments, however, the strut 24 and the pylon 22 may be arranged relative to the gas turbine engine 20 in other suitable arrangements.

Figure 4:
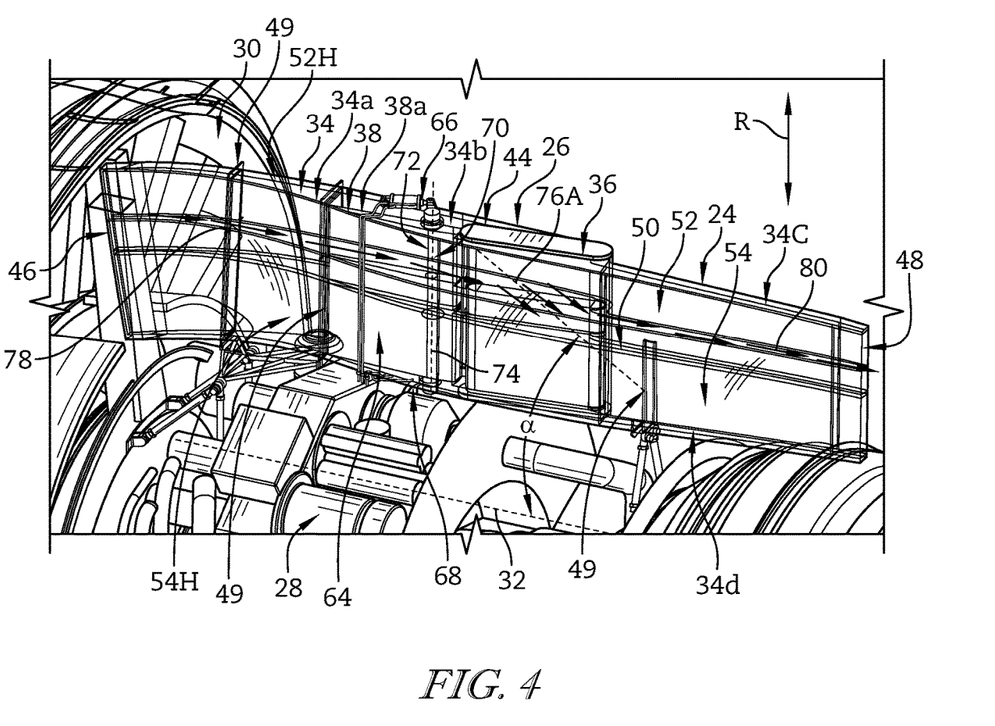
FIG. 4 is a perspective view of the cooling unit of FIG. 3 with portions of the nacelle removed for the sake of simplicity, showing a diverter valve included in the cooling unit in an open position in which pressurized bypass air passing through the cooling unit is directed into contact with a heat exchanger included in the cooling unit.

Referring now to FIG. 4, the duct 34 illustratively includes opposite walls 34a, 34b that are housed in the strut 24. Each of the walls 34a, 34b extends outwardly in the radial direction indicated by arrow R away from the engine core 28. The walls 34a, 34b are interconnected with one another by opposite walls 34c, 34d of the duct 34 that are arranged generally perpendicular to the walls 34a, 34b. The walls 34c, 34d are generally planar, whereas the walls 34a, 34b include curved segments. The walls 34a, 34b, 34c, 34d cooperate to define an interior space 44 in which the heat exchanger 36 and the diverter valve 38 are positioned.

The walls 34a, 34b, 34c, 34d extend toward the fan 30 and cooperate to define an inlet 46 adjacent thereto that opens toward the fan 30 as shown in FIG. 4. The walls 34a, 34b, 34c, 34d extend away from the heat exchanger 36 to cooperatively define an outlet 48 that opens toward an exhaust outlet. The inlet 46 is configured to receive pressurized bypass air discharged by the fan 30 and conduct the bypass air toward the outlet 48. The outlet 48 is configured to discharge bypass air received at the inlet 46 and conducted thereto through the interior space 44 of the duct 34.

The duct 34 illustratively includes a divider 50 that is positioned within the interior space 44 as shown in FIG. 4. The divider 50 extends along the length of the duct 34 between the inlet 46 and the outlet 48 to divide the duct 34 into an outer flow portion 52 and an inner flow portion 54. The inner flow portion 54 is positioned inward of the outer flow portion 52 in the radial direction indicated by arrow R.

In the illustrative embodiment, the duct 34 includes only one divider 50. In other embodiments, however, the duct 34 may include more than one divider 50. In other embodiments still, the duct 34 may not include a divider 50 at all.

The outer flow portion 52 is illustratively configured to conduct pressurized bypass air discharged by the fan 30 through the duct 34 as shown in FIG. 4. Specifically, the outer flow portion 52 conducts bypass air discharged by the fan 30 from the inlet 46 to the outlet 48. The outer flow portion 52 is defined by the walls 34a, 34b, 34c and the divider 50.

Like the outer flow portion 52, the inner flow portion 54 is illustratively configured to conduct pressurized bypass air discharged by the fan 30 through the duct 34 as suggested by FIG. 4. Specifically, the inner flow portion 54 conducts bypass air discharged by the fan 30 from the inlet 46 to the outlet 48. The inner flow portion 54 is defined by the walls 34a, 34b, 34d and the divider 50.

The duct 34 illustratively provides two circuits (i.e., outer and inner flow portions 52, 54) for conducting fluid discharged by the fan 30 between the inlet 46 and the outlet 48 as suggested by FIG. 4. Fluid is conducted by the outer flow portion 52 between the inlet 46 and the outlet 48 in substantially the same fashion as fluid is conducted by the inner flow portion 54 between the inlet 46 and the outlet 48. As such, only fluid conducted between the inlet 46 and the outlet 48 by the outer flow portion 52 is shown in FIGS. 4-7.

The heat exchanger 36 is illustratively positioned aft of the diverter valve 38 in the interior space 44 of the duct 34 as shown in FIG. 4. Both the heat exchanger 36 and the diverter valve 38 extend in the interior space 44 substantially all the way between the walls 34c, 34d. As such, the heat exchanger 36 and the diverter valve 38 extend through each of the outer and inner flow portions 52, 54.

The heat exchanger 36 is illustratively configured to transfer heat from the fluid passing along the path 28F to bypass air discharged from the fan 30 that contacts the heat exchanger 36 as suggested by FIG. 4. The heat exchanger 36 is illustratively embodied as any device configured for use as described above, subject to size constraints imposed by other components of the cooling unit 26 as described below. In one example, the heat exchanger 36 may be embodied as a tube bank heat exchanger. In another example, the heat exchanger 36 may be embodied as any one of a plate heat exchanger, a plate-and-fin heat exchanger, or the like.

Figure 5:
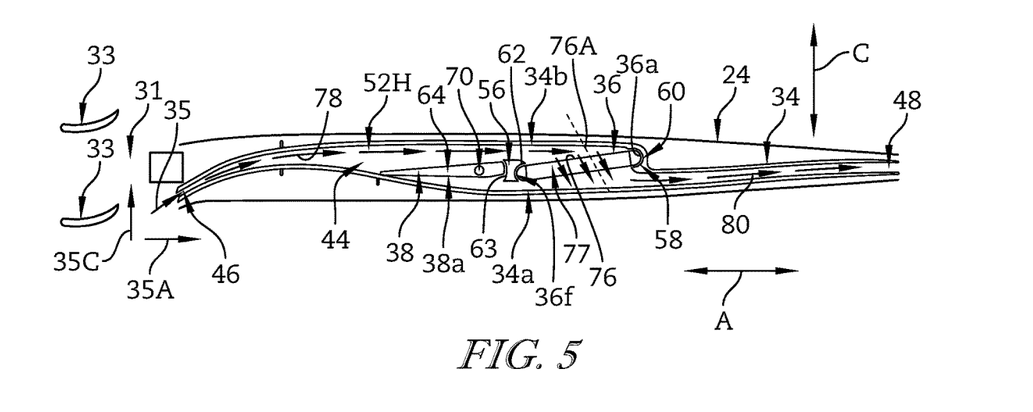
FIG. 5 is a simplified plan view of the cooling unit of FIG. 4 showing the pressurized bypass air conducted by a duct included in the cooling unit through the heat exchanger and to an outlet thereof when the diverter valve is in the open position.

As best seen in FIG. 5, the heat exchanger 36 extends in the interior space 44 of the duct 34 between the wall 34b and a guide post 56 positioned within the interior space 44. An aft end 36a of the heat exchanger 36 is received by a curved channel 58 formed in a curved segment 60 of the wall 34b that extends substantially all the way between the walls 36c, 36d. A forward end 36f of the heat exchanger 36 opposite the aft end 36a is received by a curved surface 62 of the guide post 56 that extends substantially all the way between the walls 36c, 36d. The position of the heat exchanger 36 in the interior space 44 is maintained by the wall 34b and the guide post 56 as shown in FIGS. 4-7. As such, the size of the heat exchanger 36 is constrained by the wall 34b and the guide post 56.

The diverter valve 38 illustratively includes a plate 64, an outer actuator 66 coupled to the plate 64, and an inner actuator 68 coupled to the plate 64 opposite the outer actuator 66 as shown in FIG. 4. The plate 64 is positioned in the interior space 44 and extends substantially all the way between the walls 34c, 34d. The outer actuator 66 is positioned outward in the radial direction indicated by arrow R from the wall 34c. The inner actuator 68 is positioned inward in the radial direction indicated by arrow R from the wall 34d.

The outer and inner actuators 66, 68 are illustratively coupled to the plate 66 by a cylindrical pin 70 that extends through the plate 66 and outside the walls 34c, 34d as shown in FIG. 4. The pin 70 is received by a bore 72 formed in the plate 66. The pin 70 defines an axis 74 that extends in the radial direction indicated by arrow R.

The plate 64 is slidably engaged with a curved surface 63 of the guide post 56 that is opposite the curved surface 62 in each of the open and closed positions 38a, 38b of the diverter valve 38. In the open position 38a, the plate 64 is engaged with the wall 34a. In contrast, in the closed position 38b, the plate 64 is engaged with the wall 34b.

Figure 6:
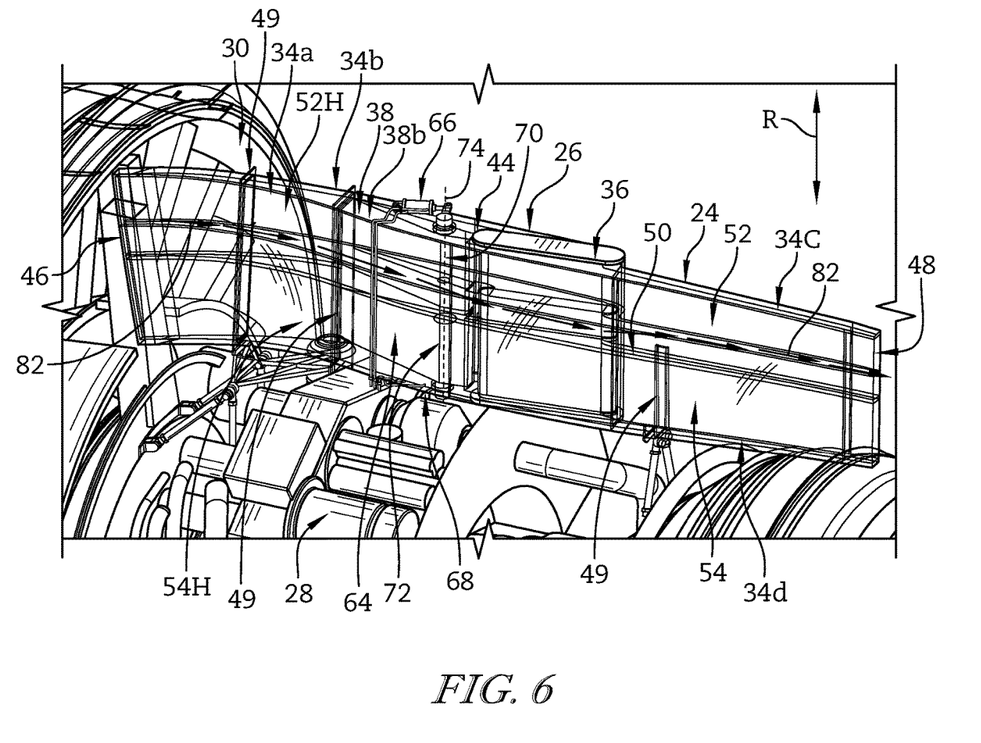
FIG. 6 is a perspective view of the cooling unit similar to FIG. 4 showing the diverter valve in a closed position in which pressurized bypass air passing through the cooling unit is diverted around the heat exchanger without contacting the heat exchanger.
Figure 7:
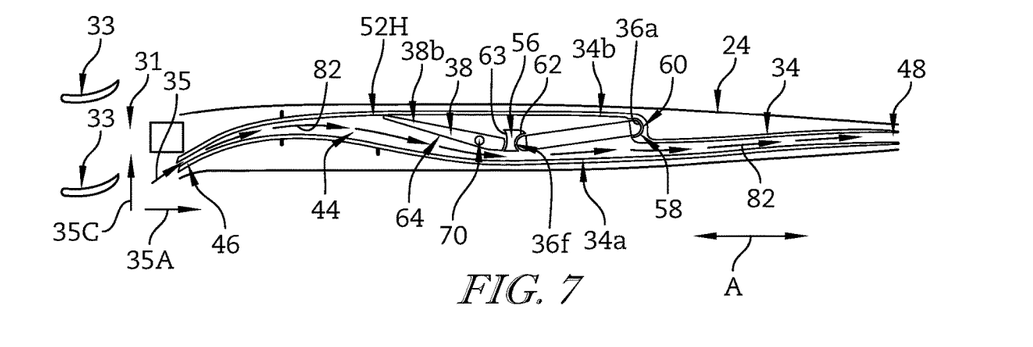
FIG. 7 is a simplified plan view of the cooling unit similar to FIG. 5 showing the pressurized bypass air conducted by the duct around the heat exchanger without contacting the heat exchanger and to the outlet thereof when the diverter valve is in the closed position.

The outer actuator 66 is illustratively operable to pivot the plate 64 about the axis 74 relative to the walls 34a, 34b between the open position 38a shown in FIGS. 4-5 and the closed position 38b shown in FIGS. 6-7. In one example, the actuator 66 may be embodied as, or otherwise include, an electrically-powered actuator such as an electrically-powered linear actuator. In another example, the actuator 66 may be embodied as, or otherwise include, a hydraulically-operated actuator such as a hydraulic piston.

The inner actuator 68 is also illustratively operable to pivot the plate 64 about the axis 74 relative to the walls 34a, 34b between the open position 38a shown in FIGS. 4-5 and the closed position 38b shown in FIGS. 6-7. In one example, the actuator 68 may be embodied as, or otherwise include, an electrically-powered actuator such as an electrically-powered linear actuator. In another example, the actuator 68 may be embodied as, or otherwise include, a hydraulically-operated actuator such as a hydraulic piston.

The outer and inner actuators 66, 68 are illustratively actuatable together to pivot the plate 66 between the open and closed positions 38a, 38b as suggested by FIG. 4. To do so, the actuators 66, 68 may be actuated contemporaneously, or substantially contemporaneously. In any case, the outer actuator 66 is actuatable to pivot the plate 64 between the positions 38a, 38b in the event of a failure of the inner actuator 68. Conversely, the inner actuator 68 is actuatable to pivot the plate 64 between the positions 38a, 38b in the event of a failure of the outer actuator 66. In that way, the actuators 66, 68 provide redundant mechanisms for pivoting the plate 64 between the positions 38a, 38b.

The duct 34 is supported relative to the gas turbine engine 20 and components thereof by supports 49 as shown in FIG. 4. Two of the supports 49 are illustratively positioned between the inlet 46 and the heat exchanger 36, and one of the supports 49 is illustratively positioned between the heat exchanger 36 and the outlet 48. In other embodiments, however, the supports 49 may include any suitable number of supports other than three supports that are arranged between the inlet 46 and the outlet 48 in any other suitable arrangement.

Referring now to FIG. 5, fluid flow from an outlet 31 of the fan 30 to the inlet 46 of the duct 34 is shown in greater detail. Bypass air is discharged by fan blades 33 of the fan 30 at the outlet 31 to the inlet 46 in a direction 35. The direction 35 illustratively has an axial component 35A in an axial direction indicated by arrow A. The direction 35 also has a circumferential component 35C in the circumferential direction indicated by arrow C. The inlet 46 is shaped to open in the axial direction indicated by arrow A and in the circumferential direction indicated by arrow C. In this way, the inlet 46 is shaped to receive the bypass air discharged by the fan 30 at the outlet 31 in the direction 35. Accordingly, substantially all of the total pressure of the bypass air discharged by the fan 30 is captured by the inlet 46 of the duct 34 in operation of the propulsion system 14.

In other embodiments, the duct 34 may include another type of inlet adapted for use in the manner described above with regard to the inlet 46. For example, the duct 34 may include a NACA inlet or any other similar inlet that forms a generally smooth contour with a surface of the strut 24.

The outer flow portion 52 and the inner flow portion 54 illustratively extend from the inlet 46 to the heat exchanger 36 to define respective headers 52H, 54H as shown in FIGS. 4-5. The headers 52H, 54H are configured to conduct bypass air discharged by the fan 30 from the inlet 46 toward the heat exchanger 36. When the diverter valve 38 is in the open position 38a, bypass air is conducted through the headers 52H, 54H and into contact with the heat exchanger 36. When the diverter valve 38 is in the closed position 38b, bypass air is conducted through the headers 52H, 54H around the heat exchanger 36 without contacting the heat exchanger 36.

The heat exchanger 36 is illustratively positioned within the interior space 44 of the duct 34 so that the heat exchanger 36 extends along a heat exchanger axis 76A that is substantially perpendicular to a face 76 of a core 77 of the heat exchanger 36 as shown in FIG. 5. The heat exchanger 36 is arranged to transfer heat from the medium to be cooled (i.e., fluid from the engine core 28 passing along the path 28F through the face 76) to the cooling medium (i.e., bypass air discharged by the fan 30).

When the diverter valve 38 is in the open position 38a, the header 52H conducts bypass air discharged by the fan 30 from the inlet 46 to the heat exchanger 36 along a forward flow path 78 as shown in FIG. 5. Bypass air is conducted by the header 52H along the path 78 through the face 76 at an angle α that is defined between the heat exchanger axis 76A and the engine axis 32.

In the illustrative embodiment, the angle α is somewhere between 30 degrees and 90 degrees. The header 52H, and also the header 54H, may be said to be oblique headers. As used herein, oblique headers conduct bypass air toward the core 77 of the heat exchanger 36 so that the flow of bypass air along the forward flow path 78 is not perpendicular to the face 76 of the core 77. The headers 52H, 54H may be embodied as, or otherwise include, oblique headers that are arranged in a free-discharge configuration. In another example, the headers 52H, 54H may be embodied as, or otherwise include, oblique headers that are arranged in a parallel-flow configuration. In other embodiments, another suitable angle α may be defined between the heat exchanger axis 76A and the engine axis 32.

When the diverter valve 38 is in the open position 38a, bypass air moving along the forward flow path 78 flows through the core 77 and exits the heat exchanger 36 as shown in FIG. 5. Bypass air exiting the heat exchanger 36 is illustratively conducted by the duct 34 along an aft flow path 80 to the outlet 48. Beside the portion of the forward flow path 78 passing through the face 76, the forward flow path 78 is generally parallel to the aft flow path 80.

As best seen in FIGS. 5 and 7, the outlet 48 of the duct 34 is shaped to discharge bypass air in substantially the axial direction indicated by arrow A only to mix with other exhaust of the propulsion system 14. Bypass air discharged by the outlet 48 may be communicated to a space positioned outside of the gas turbine engine 20 or the nacelle 20 in some embodiments.

Operation of the propulsion system 14 will now be described with reference to FIGS. 4-5. During operation of the gas turbine engine 20, the cooling unit 26 is operated so that the diverter valve 38 is in the open position 38a. When the diverter valve 38 is in the open position 38a, fluid passes along the path 28F from the engine core 28 to the heat exchanger 36 and is returned back to the engine core 28 by the heat exchanger 36. Bypass air discharged by the fan 30 flows along the forward flow path 78 and is directed into contact with the heat exchanger 36. The bypass air flows through the heat exchanger 36 such that heat is transferred from the fluid from the engine core 28 to the bypass air. As a result, the temperature of the bypass air increases, and the temperature of the fluid from the engine core 28 decreases. The increased temperature bypass air is then conducted along the aft flow path 80 to the outlet 48 and discharged therefrom. The cooled fluid from the engine core 28 is returned to the engine core 28 by the heat exchanger 36. The cooled fluid is directed to one or more components of the engine core 28 to manage the temperature of the components(s).

Operation of the propulsion system 14 will now be described with reference to FIGS. 6-7. During operation of the gas turbine engine 20, the cooling unit 26 is operated so that the diverter valve 38 is in the closed position 38b. When the diverter valve 38 is in the closed position 38b, no fluid from the engine core 28 is provided to the cooling unit 26, and bypass air discharged by the fan 30 is diverted around the heat exchanger 36 along a flow path 82. The temperature of the bypass air therefore remains substantially the same as the bypass air flows away from the inlet 46, around the heat exchanger 36, and to the outlet 48 along the path 82.

Referring to FIGS. 4-7, operation of the propulsion system 14 may vary in certain instances. In one instance, it may be desirable to manage the temperatures of components of the engine core 28. To do so, the cooling unit 26 may be operated to place the diverter valve 38 in the open position 38a, or in any other position between the open position 38a and the closed position 38b to control the cooling of the medium to be cooled (i.e., fluid from the engine core 28). In other instances, it may be desirable to avoid pressure losses resulting from directing fluid from the engine core 28 to the cooling unit 26, and thereby increase the operating efficiency of the gas turbine engine 20. To do so, the cooling unit 26 may be operated to place the diverter valve 38 in the closed position 38b. In such instances, fluid from the engine core 28 is not cooled by the cooling unit 26.

Figure 8:
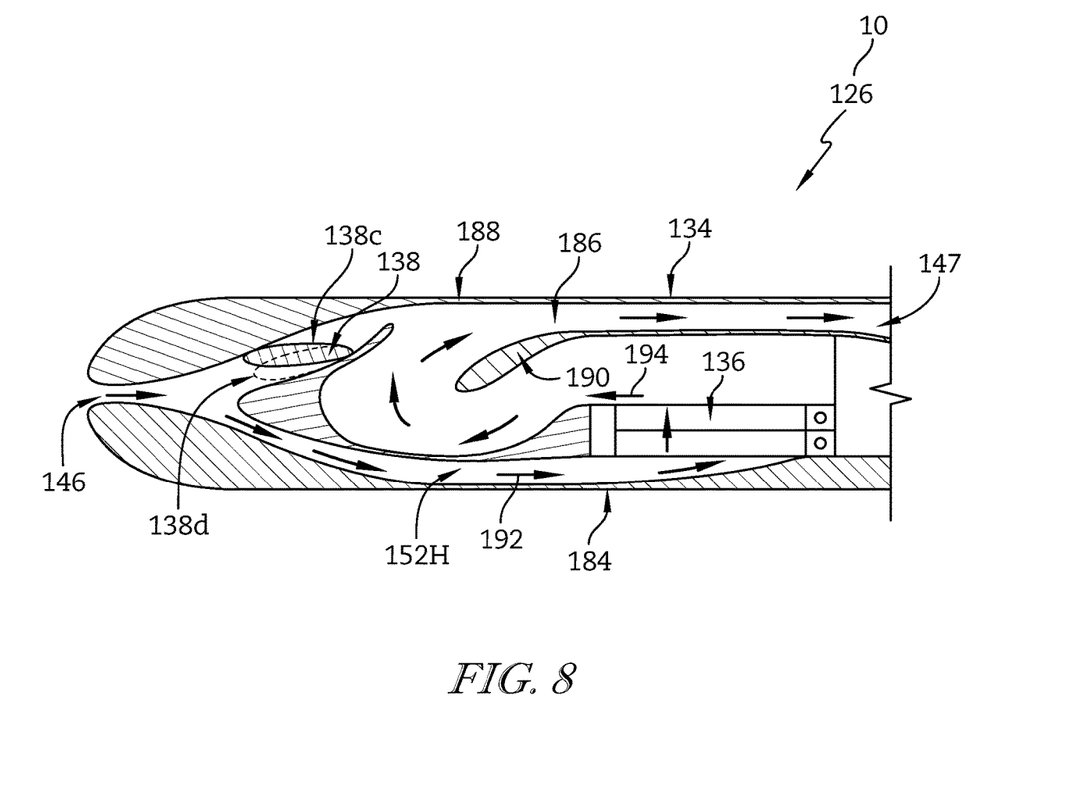
FIG. 8 is a diagrammatic view of another cooling unit including a duct, a diverter valve positioned in the duct, and a heat exchanger positioned in the duct showing pressurized bypass air conducted by the duct through the heat exchanger to an outlet of the duct when the diverter valve is in a closed position.

Referring now to FIG. 8, a cooling unit 126 is shown in detail. The cooling unit 126 may be adapted for use in the aircraft 10. Specifically, the cooling unit 126 may be included in the nacelle 18 of the propulsion system 14 and sized to be positioned in the strut 24.

The cooling unit 126 illustratively includes a duct 134, a heat exchanger 136, and a diverter valve 138 as shown in FIG. 8. The heat exchanger 136 and the diverter valve 138 are positioned within the duct 134, and the diverter valve 138 is movable therein from a closed position 138c (shown in FIG. 8) to an open position 138d (shown in phantom). In the closed position 138c, the diverter valve 138 directs pressurized bypass air (e.g., bypass air discharged from the fan 30) through the duct 134 and into contact with the heat exchanger 136. In the open position 138d, the diverter valve 138 permits pressurized bypass air to flow around the heat exchanger 136 without contacting the heat exchanger 136. The cooling unit 126 is therefore configured to selectively pass bypass air through the heat exchanger 136.

The duct 134 illustratively includes an outer wall 184 that extends from an inlet 146 of the duct 134 to the heat exchanger 136 to define a header 152H as shown in FIG. 8. The header 152H is configured to conduct pressurized bypass air from the inlet 146 toward the heat exchanger 136. When the diverter valve 138 is in the closed position 138c, bypass air is conducted through the header 152H and into contact with the heat exchanger 136. When the diverter valve 138 is in the open position 138d, at least some of the pressurized bypass air is not conducted through the header 152H and into contact with the heat exchanger 136. Rather, at least some of the pressurized bypass air is conducted through a passage 186 defined between an outer wall 188 of the duct 134 and a separator wall 190 of the duct 134 when the diverter valve 138 is in the open position 138d. In any case, in each of the closed and open positions 138c, 138d, bypass air passing to the passage 186 is conducted to an outlet 147 of the duct 134 that is arranged opposite the inlet 146. The outer wall 188 is arranged opposite the outer wall 184 and the separator wall 190 is arranged between the outer wall 188 and the heat exchanger 136.

When the diverter valve 138 is in the closed position 138c, pressurized bypass air is conducted by the header 152H toward the heat exchanger 136 along a flow path 192 as shown in FIG. 8. Bypass air directed into contact with the heat exchanger 136 by the header 152H passes through the heat exchanger 136 and around the separator wall 190 into the passage 186 along a flow path 194. Portions of the flow paths 192, 194 run substantially counter to one another. As such, the duct 134 may be said to provide a counterflow arrangement for conducting bypass air from the inlet 146 to the outlet 147 along the flow paths 192, 194.

The present disclosure may provide means for cooling air discharged by a compressor of a gas turbine engine, such as the engine 20, using bypass air discharged by a fan, such as the bypass air discharged by fan 30. The present concept may be embodied as an active cooling system that may be packaged as a single unit and placed between the walls of an airframe-mounted lower-bifurcation duct, such as the duct 34. Advantages of the present concept may include minimal impact to the performance of the gas turbine engine, packaging benefits, and size benefits compared to accessories mounted in an engine core, such as the engine core 28, of the engine.

The present concept may provide the ability to meter the bypass air flowing across the heat exchanger, such as the heat exchanger 36. The heat may be operated in a heat exchanger mode, such as when the diverter valve 38 is in the open position 38a, and a full bypass mode, such as when the diverter valve 38 is in the closed position 38b.

The present concept may provide the ability to increase the performance of the gas turbine engine by avoiding a pressure drop when cooling via the heat exchanger is not required. The present concept may also provide the ability to manage the temperature and thermal gradients of engine core components to increase core component life.

The present concept may have a minimal impact on the engine core of the gas turbine engine. The present concept may be positioned inside an unused lower-bifurcation duct and may extend over a distance that minimizes cold side ducting. The present concept may utilize oblique headers, such as the headers 52H, 54H, to the heat exchanger in order to reduce space that would otherwise be taken up with a long and large diffusion path. The arrangement of the heat exchanger may also enable a larger heat exchanger inlet area, thereby enabling a lighter heat exchanger design with a lower pressure loss on the bypass stream side.

The present concept may also provide redundancy through two independent heat exchanger flow circuits, such as the outer and inner flow portions 52, 54. The present concept may include a diverter valve, such as the diverter valve 38, that is actuatable by two actuators in tandem with one another, such as the outer and inner actuators 66, 68.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A propulsion system for an aircraft, the propulsion system comprising:
a gas turbine engine including an engine core and a fan coupled to the engine core for rotation about an engine axis, the fan configured to discharge pressurized bypass air that is passed around the engine core, and
a nacelle surrounding a portion of the gas turbine engine, the nacelle including an outer shroud arranged around the gas turbine engine, a strut that extends radially between the outer shroud and the gas turbine engine, and a cooling unit housed in the strut, the cooling unit fluidly coupled to the gas turbine engine to cool fluid or gas from the gas turbine engine to provide a cooled fluid or gas and return the cooled fluid or gas to the gas turbine engine,
wherein the cooling unit includes a duct located in the strut to conduct continuously a portion of the pressurized bypass air through the duct and the strut during operation of the gas turbine engine, a heat exchanger positioned within the duct, and a diverter valve that is movable within the duct from a first position arranged to direct the portion of the pressurized bypass air conducted through the duct toward and into contact with the heat exchanger to a second position arranged to divert the portion of the pressurized bypass air conducted through the duct away from and around the heat exchanger and away from and around any other heat exchanger positioned in the duct to avoid pressure loss caused by directing the portion of the pressurized bypass air into contact with the heat exchanger,
wherein the duct includes a first wall housed in the strut and a second wall housed in the strut and spaced circumferentially apart from the first wall relative to the engine axis, the first and second walls extending radially outwardly away from the engine axis and extending axially relative to the engine axis, and
wherein the heat exchanger is positioned between the first wall and a guide post that is located circumferentially between the first wall and the second wall, and the diverter valve is located adjacent the guide post and configured to move relative to the guide post between the first position in which the diverter valve engages the second wall and the second position in which the diverter valve engages the first wall.

2. The propulsion system of claim 1, wherein the cooling unit is positioned radially-outward of the engine core and radially-inward of an outer shroud included in the nacelle.

3. The propulsion system of claim 1, wherein the duct includes a divider extending along the length of the duct to divide the duct into an outer flow portion and an inner flow portion positioned radially-inward of the outer flow portion.

4. The propulsion system of claim 1, wherein the diverter valve includes a first actuator and a plate coupled to the first actuator, the first actuator operable to pivot the plate relative to the duct between the first and the second positions.

5. The propulsion system of claim 4, wherein the diverter valve includes a second actuator coupled to the plate, the second actuator operable to move the plate relative to the duct between the first and the second positions in the event of a failure of the first actuator.

6. The propulsion system of claim 1, wherein (i) the heat exchanger has a core having a face, and (ii) the portion of the pressurized bypass air directed into contact with the heat exchanger by the diverter valve when the diverter valve is in the first position is conducted by a header included in the duct to the core at an angle to the face that is different from 90 degrees.

7. The propulsion system of claim 6, wherein the portion of the pressurized bypass air directed into contact with the heat exchanger by the diverter valve when the diverter valve is in the first position is conducted by the header from an inlet of the duct to the core of the heat exchanger along a forward flow path generally parallel to an aft flow path along which the portion of the pressurized bypass air is conducted away from the heat exchanger to an outlet of the duct.

8. The propulsion system of claim 1, wherein (i) the fan is configured to discharge the pressurized bypass air in a direction having a circumferential component and an axial component at an outlet thereof, and (ii) an inlet of the duct is shaped to open axially and circumferentially to receive the portion of the pressurized bypass air discharged from the fan so that the total pressure of the portion of the pressurized bypass air is captured by the duct during operation of the propulsion system.

9. The propulsion system of claim 1, wherein the duct includes an inlet and an outlet spaced axially aft of the inlet relative to the engine axis and the diverter valve is spaced apart axially from both the inlet and the outlet of the duct.

10. The propulsion system of claim 1, wherein the heat exchanger includes a first end located adjacent the first wall and a second end spaced apart circumferentially from the first and second walls to define a circumferential gap between the second wall and the second end of the heat exchanger.

11. The propulsion system of claim 10, wherein the guide post includes a forward curved surface that engages the diverter valve and an aft curved surface opposite the forward curved surface that receives the second end of the heat exchanger to locate the heat exchanger between the first wall and the guide post.

12. The propulsion system of claim 11, wherein the diverter valve includes a first actuator and a plate coupled to the first actuator, the first actuator operable to pivot the plate relative to the guide post between the first position to engage the plate with the second wall and the second position to engage the plate with the first wall.

13. An aircraft comprising:
an airframe,
a gas turbine engine supported by the airframe, the gas turbine engine including an engine core defining an engine axis and a fan coupled to the engine core, the fan configured to discharge pressurized bypass air that is passed around the engine core, and
a nacelle supported by the airframe and surrounding a portion of the gas turbine engine, the nacelle including an outer shroud arranged around the gas turbine engine, a strut that extends outwardly from the gas turbine engine radially between the outer shroud and the gas turbine engine relative to the engine axis, and a cooling unit housed in the strut that is fluidly coupled to the gas turbine engine to cool fluid or gas from the gas turbine engine,
wherein the cooling unit is configured to receive continuously a portion of the pressurized bypass air from the fan during operation of the gas turbine engine and to pass the portion of the pressurized bypass air through a heat exchanger included in the cooling unit during operation of the aircraft, wherein the cooling unit includes a duct housed in the strut and a diverter valve located in the duct, the heat exchanger is located in the duct, and the diverter valve is movable within the duct from a first position arranged to direct the portion of the pressurized bypass air conducted through the duct toward the heat exchanger to a second position arranged to divert the portion of the pressurized bypass air conducted through the duct away from the heat exchanger, wherein the duct includes a first wall housed in the strut, a second wall housed in the strut and spaced circumferentially apart from the first wall relative to the engine axis, and a guide post located circumferentially between both the first wall and the second wall to define a first passage between the first wall and the guide post and a second passage between the second wall and the guide post, the portion of the pressurized bypass air flows continuously through the duct via at least one of the first passage and the second passage during operation of the gas turbine engine, and the heat exchanger extends from the first wall to the guide post and terminates at the guide post, wherein the diverter valve includes a first actuator and a plate coupled to the first actuator, the first actuator operable to pivot the plate relative to the duct between the first and the second positions, and wherein the diverter valve includes a second actuator coupled to the plate, the second actuator operable to move the plate relative to the duct between the first and the second positions in the event of a failure of the first actuator.

14. The aircraft of claim 13, wherein the duct further includes a separator wall located circumferentially between the first wall and the guide post to define a third passageway between the guide post and the separator wall and a fourth passageway between the first wall and the separator wall, the diverter valve is arranged in the first passageway and configured to engage the first wall to block flow through the first passageway when the diverter valve is in the first position and to be spaced apart from the first wall to allow flow through the first passageway when the diverter valve is in the second position.

15. The aircraft of claim 13, wherein the guide post is C-shaped and includes a concave wall and a convex wall that is spaced apart circumferentially from the concave wall and the convex wall defines at least a portion of the first passage and at least a portion of the second passage.

16. The aircraft of claim 15, wherein the duct further includes a separator wall located circumferentially between the first wall and the guide post, a first portion of the separator wall extends axially and a second portion of the separator wall extends axially and circumferentially toward the concave wall and into a concavity defined by the concave wall to define a curved third passage.

* * * * *